United States Patent
Makadia et al.

(10) Patent No.: US 8,788,434 B2
(45) Date of Patent: Jul. 22, 2014

(54) SEARCH WITH JOINT IMAGE-AUDIO QUERIES

(75) Inventors: Ameesh Makadia, New York, NY (US); Jason E. Weston, New York, NY (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 12/914,653

(22) Filed: Oct. 28, 2010

(65) Prior Publication Data
US 2012/0109858 A1  May 3, 2012

(51) Int. Cl.
*G06F 15/18* (2006.01)

(52) U.S. Cl.
USPC .......................................................... 706/12

(58) Field of Classification Search
USPC .............................................. 706/12, 45, 62
See application file for complete search history.

(56) References Cited

U.S. PATENT DOCUMENTS

| | | | |
|---|---|---|---|
| 6,243,713 B1 | 6/2001 | Nelson et al. | |
| 7,702,681 B2 | 4/2010 | Brewer et al. | |
| 2005/0038814 A1 | 2/2005 | Iyengar et al. | |
| 2010/0135584 A1* | 6/2010 | Tang et al. | 382/218 |
| 2011/0289064 A1* | 11/2011 | Lebeau et al. | 707/706 |

OTHER PUBLICATIONS

Srihari, Use of Multimedia Input in Automated Image Annotation and Content-Based Retrieval, Feb. 1995, SPIE, vol. 2420, pp. 249-260.*
Zhang et al., A probabilistic semantic model for image annotation and multi-modal image retrieval, 2006, DOI, pp. 27-33.*
Xie, et al., Mobile Search With Multimodal Queries, 2008, IEEE, pp. 589-601.*
Yeh et al., Searching the Web with Mobile Images for Location Recognition, 2004, IEEE, pp. 1-6.*
Fei, Wu et al. "Understanding Multimedia Document Semantics for Cross-Media Retrieval," Lecture Notes in Computer Science, vol. 3767, 2005, pp. 993-1004.
Srihari RK "Use of Multimedia Input in Automated Image Annotation and Content-Based Retrieval," Proceedings of SPIE, SPIE, US vol. 2420, Feb. 9, 1995, pp. 249-260.
Notification of Transmittal of the International Search Report and the Written Opinion of the International Searching Authority, or the Declaration. International Application No. PCT/US2011/058362. European Patent Office, Feb. 28, 2012, 13 pages.

* cited by examiner

*Primary Examiner* — David Vincent
(74) *Attorney, Agent, or Firm* — Fish & Richardson P.C.

(57) ABSTRACT

Methods, systems, and apparatus, including computer programs encoded on a computer storage medium, for processing joint image-audio queries. In one aspect, a method includes receiving, from a client device, a joint image-audio query including query image data and query audio data. Query image feature data is determined from the query image data. Query audio feature data is determined from the audio data. The query image feature data and the query audio feature data are provided to a joint image-audio relevance model trained to generate relevance scores for a plurality of resources, each resource including resource image data defining a resource image for the resource and text data defining resource text for the resource. Each relevance score is a measure of the relevance of corresponding resource to the joint image-audio query. Data defining search results indicating the order of the resources is provided to the client device.

13 Claims, 5 Drawing Sheets

SEARCH WITH JOINT IMAGE-AUDIO QUERIES

BACKGROUND

This specification relates to processing queries, particularly to queries including both an image and associated audio.

The Internet provides access to a wide variety of resources, for example, video files, image files, audio files, or Web pages including content for particular subjects, book articles, or consumer products. A search system can select one or more resources in response to receiving a search query. A search query is data that a user submits to a search engine to satisfy the user's informational needs. The search system selects and scores resources based on their relevance to the search query. The search results are typically ordered according to the scores, and provided in a search results page.

To search image resources, a search system can determine the relevance of an image to a text query based on the textual content of the resource in which the image is located and also based on relevance feedback associated with the image. Some search systems search image resources by using query images as input. A query image is an image, such as a jpeg file, that is used by a search engine as input to a search processing operation. Related images can be found by processing other images and identifying images that are similar in visual appearance to the query image. The use of query images is becoming much more prevalent with the advent of smart phones that include cameras. For example, using a smart phone, a user can now take a picture of a subject of interest, and submit the picture to a search engine. The search engine then searches image resources using the picture as a query image.

However, viewers interpret images in a much more subjective manner than text. Thus, while the images that are identified may be similar in appearance to the query image, many of the images may not be of interest to the viewer. For example, a user may conduct a search on an image of a car. The user may be interested in other cars of that brand, but an image search based only on visual similarity might return images of cars of different brands.

SUMMARY

In general, one innovative aspect of the subject matter described in this specification can be embodied in methods that include the actions of receiving a joint image-audio query from a client device, the joint image-audio query including query image data defining a query image and query audio data defining query audio; determining query image feature data from the query image data, the query image feature data describing image features of the query image; determining query audio feature data from the audio data, the query audio feature data describing audio features of the query audio; providing the query image feature data and the query audio feature data to a joint image-audio relevance model, the joint image-audio relevance model trained to generate relevance scores for a plurality of resources, wherein each resource includes resource image data defining a resource image for the resource and text data defining resource text for the resource, and wherein each relevance score is a measure of the relevance of corresponding resource to the joint image-audio query; ordering the resources according to the corresponding relevance score; and providing data defining search results indicating the order of the resources to the client device. Other embodiments of this aspect include corresponding systems, apparatus, and computer programs, configured to perform the actions of the methods, encoded on computer storage devices.

Another aspect of the subject matter described in this specification can be implemented in methods that include the actions of accessing image annotation data describing a plurality of annotation pairs, each annotation pair including image data defining an image and text data associated with the image; accessing resources, each resource defining a resource image for the resource and text data defining resource text for the resource; and training a joint image-audio relevance model on the image annotation data and the resources to generate relevance scores for a plurality of resources, and wherein each relevance score is a measure of the relevance of a corresponding resource to a joint image-audio query that includes query image data defining a query image and query audio data defining query audio. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Adding audio data to an image query can improve relevance of search results on the query. Relevance can be improved both by providing information that can aid the system in extracting the object of interest in an image, and also by providing information that supplements the user's search beyond what can be found in the image. This information can also be added in various other ways. In some embodiments, a portion of the image can be selected as containing the object of interest by the user drawing a circle on the image using a touch screen. The user can also outline the object of interest more closely than a circle or other shape, and can also draw the outline using other input methods. In some embodiments, the user can add additional information regarding the image using a dropdown menu box. The menu box can have different categories of items, such as shopping categories including shoes, shirts, pants, and others similar categories.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

§1.0 Overview

An application running on a mobile phone allows a user to take a picture of an object and speak into the phone to record the user's speech. The audio recording is paired with the image to form a joint image-audio query. The mobile device then submits the joint image-audio query to a search system.

The search system receives the joint image-audio query and determines text data from the speech and generates image feature data from the image. The search system uses the text data and the image feature data as inputs into a joint image-audio relevance model, which compares resources to the input data. The resources can be any of the resources found on the Internet, including web pages, documents, images, and video. As one example, each resource can be a document for a product, which includes an image of the product and associated text data of the product. The joint image-audio relevance model compares the query image feature data to the image feature data of each resource and the query text data to the corresponding resource text data and computes a relevance score for each resource. The system orders the resources according to the relevance scores and presents search results to the user. The search results include links to the ordered resources, and may also include additional information about each resource, for example, thumbnails of the resource image or subsets of the resource text.

For the joint image-audio relevance model to determine the relevance of a joint image-audio query to the resources, the model is first trained. Training the model involves using image annotation data, which are annotation pairs. Each annotation pair is an image paired with text data associated with the image. These annotation pairs are used as training inputs to the joint image-audio relevance model, along with training and testing resources for the annotation pairs. The joint image-audio relevance model is trained until the testing resources are ranked in a manner that is deemed to be acceptable, as defined by one or more criteria.

Figure 1:
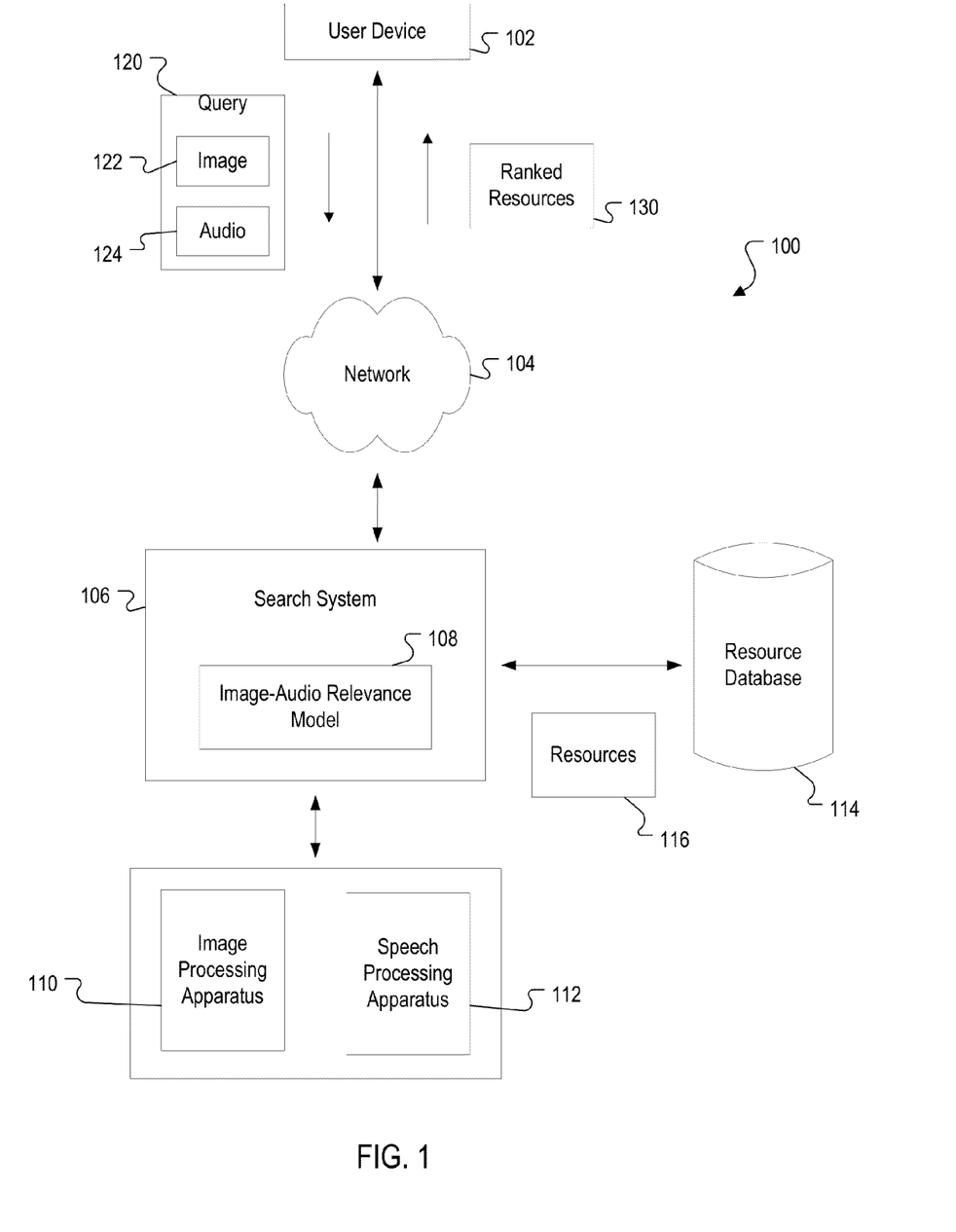
FIG. 1 is a block diagram of an example environment in which a joint image-audio search system provides search services.

FIG. 1 is a block diagram of an example environment 100 in which a joint image-audio search system 106 provides search services. The example environment 100 includes a network 104, such as the Internet, connecting a user device 102 to a search system 106. The user device 102 transmits a joint image-audio query 120 that includes a pairing of image 122 and audio 124 data over the network 104 to the search system 106. Example audio 124 is a speech recording. The system 106 processes the image 122 and audio 124 data and compares them to a collection of resources 116, computing a relevance score for each resource 116. The system 106 ranks these resources 116 by their relevance scores and sends a list of search results, each of which includes a resource link 130 to a corresponding resource, to the user device 102.

The user device 102 is an electronic device that is under control of a user and is capable of requesting and receiving resources 116 over the network 104. Example user devices 102 include personal computers, mobile communication devices, and other devices that can send and receive data over the network. A user device 102 typically includes a user application, e.g., a web browser, to facilitate the sending and receiving of data over the network 104. The user device 102 may also include a camera and a microphone for acquiring an image 122 and audio 124. The user device also includes an application that pairs the audio 124 with the image 122 to form a joint-image audio query. The query audio 124 typically includes speech data that provides more information about the image 122 or about the user's search parameters.

Figure 2A:
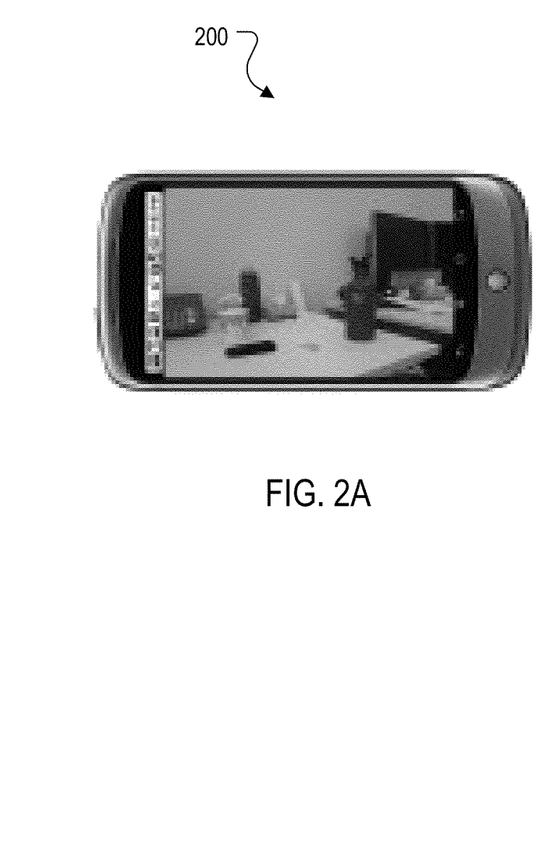
FIGS. 2A and 2B are example images for a joint image-audio query.

By way of example, assume a user is searching for a water bottle, and the query image 122 is a picture of a water bottle taken by the user device 102. Refer, for example, to FIG. 2A. In FIG. 2A, the image may include more than just the water bottle. After taking the image, the user specifies that the water bottle is the object of interest in the picture by augmenting the query image 122 with the query audio 124, "water bottle." Alternatively, the user may provide more specific information, for example, by including "red water bottle" as the query audio 124. The query audio 124 may also include positional information, for example if there is more than one object in the query image 122, the user may specify by submitting the query audio 124, "red bottle on the right."

Figure 2B:
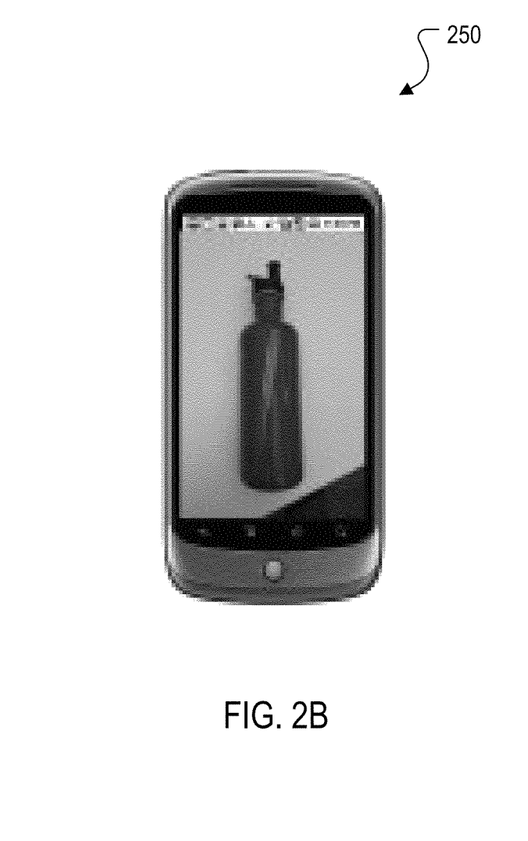

Even with a single object in the picture, audio information may improve the results of a search. For example, FIG. 2B contains only the water bottle in the picture. However, if a search were conducted to find similar images based on the visual features alone, the results may include only bottles that have a similar shape and color, and may not include other types of water bottles. By augmenting the image with the audio, e.g., "water bottle" or "water bottle for bicycle rides," the system provides additional information to the search system, and the search system uses this additional information to provide search results that are likely to satisfy the user's informational needs.

Further, the user may also provide parameters by use of audio to restrict the search results. For example, the user may be searching a product database to find a water bottle for purchase. The user may provide to the search system the image 122 of the water bottle and the query audio 124, "Brand X water bottle under ten dollars," or as another example, "this water bottle in blue."

Referring back to FIG. 1, the search system 106 receives the joint image-audio query that includes the image 122 data and the audio 124 data from the user device 102 through the network 104. In some implementations, the search system 106 includes an image processing apparatus 110 to generate image feature data from the image 122 data. Alternatively, in other implementations, the search system passes the image 122 data to a separate image processing apparatus 110 and receives the image feature data from the separate image processing apparatus 110. Similarly, the search system 106 may also include a speech processing apparatus 112 to extract text data from the audio 124 data, or it may pass the audio 124 data to a separate speech processing apparatus 112 and receive the text data.

The search system 106 uses the image feature data and the text data derived from the joint image-audio query as input to a joint image-audio relevance model 108. The joint image-audio relevance model 108 receives these two inputs and also receives resources 116. The joint image-audio relevance model 108 scores each resource 116 indicating a measure of relevance of the resource 116 to the joint image-audio query.

In some implementations, the search system, using the joint image-audio relevance model 108, computes a score for each resource according to the following ranking function:

$$REL_i = f(S, I, R_i)$$

where
  $REL_i$ is a relevance score for a resource $R_i$;
  S is the audio data 124;
  I is the image data 122; and
  $R_i$ is a given resource in a resource database or cache. The function $f(S, I, R)$ is described in more detail with respect to FIG. 3B below.

A resource 116 is any data that can be provided over a network 104 and is associated with a resource address or indexed in a database. In some implementations, a resource database 114 comprises a collection of resources 116, with each resource 116 including a resource image and resource text. One example of a resource database 114 is a product database that includes product documents comprising an image of a product and data describing the product, such as brand name, price, and a textual description.

For each $i^{th}$ resource, the search system 106 determines resource image feature data from the resource image in a manner similar to how it determines query image feature data from the query image. The search system 106 also determines resource text data from the resource 116. The joint image-audio relevance model 108 then compares the query image feature data to the resource image feature data and the query text data to the resource text data of a resource 116 and computes a relevance score $REL_i$ for the resource 116. The model 108 provides the relevance scores to the search system 106. The search system 106 then orders the resources according to the relevance scores, and provides search results 130, ranked by the relevance scores of the resources, to the user device 102.

§2.0 Processing a Joint Image-Audio Query

Figure 3A:
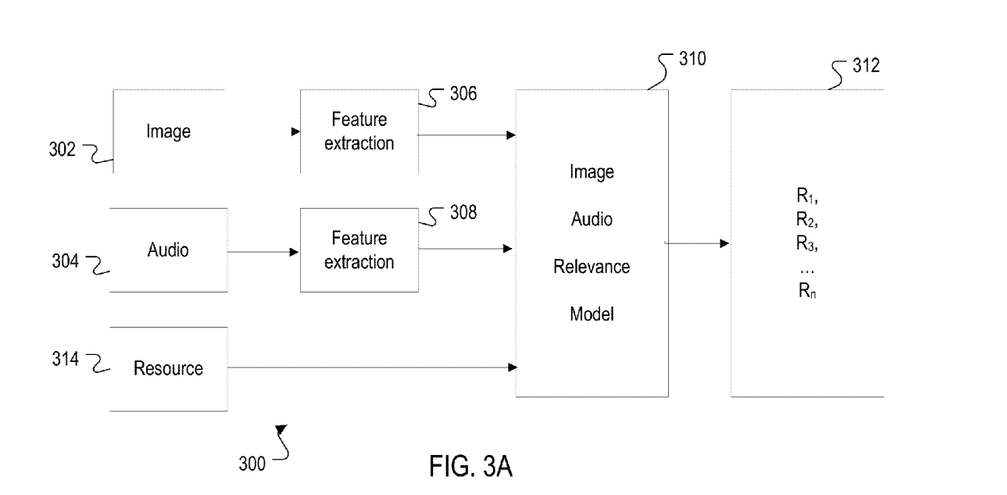
FIG. 3A is a block diagram of an example process for querying a joint image-audio search system.
Figure 3B:
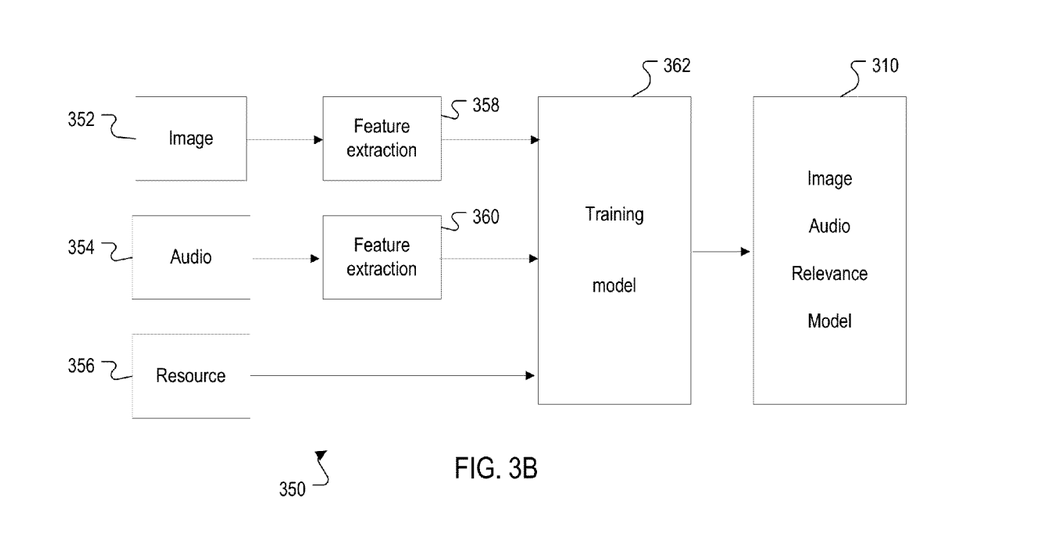
FIG. 3B is a block diagram of an example process for training a joint image-audio relevance model.

FIG. 3A is a block diagram of an example process 300 for querying a joint image-audio search system. The search system 106 receives the joint image-audio query, comprising image data 302 and audio data 304. This data is received through the network and, in some implementations, the image data 302 is a picture taken of a query object by a user. The audio data 304 includes speech recorded by the user containing information about the query object or about the desired query results. These are paired together as the joint image-audio query.

The audio data 304 includes audio pertaining to speech. The speech data 304 is converted to text data 308 using speech recognition algorithms. The text 308 is further analyzed using natural language processing techniques to parse the content of the text data 308. For example, the image 302 in the joint image-audio query may contain a water bottle, as in FIG. 2A. The audio data 304 accompanying this image may simply be, "water bottle." The search system 106 converts this speech 304 into text data 308 and uses the text 308 as a search parameter when comparing with resource text data.

Using natural language processing, the search system 106 can determine spatial areas of the image for inclusion or exclusion. For example, the audio 304 may contain the speech, "water bottle in the right of the picture." The search system 106 converts this speech 304 into text data 308 and parses the statement. The system 106 determines that the right of the picture is an area of interest from the phrase "in the right of the picture," and thus ignores features and objects recognized in the left of the picture 302 and focuses only on those found on the right.

Using natural language processing, the search system 106 can detect sentiments for particular features or characteristics. For example, the image 302 in the joint image-audio query may contain a red water bottle, as in FIG. 2B. The audio 304, however, may contain the speech, "only blue water bottles, not red." The search system 106 converts this speech 304 into text data 308 and parses the statement to interpret that the user wants only blue water bottles in the search results, as opposed to the red water bottle in the image 302.

From the image data 302 of the image-audio query, the search system 106 generates image feature value data 306. Image feature value data 306 are value scores that represent visual characteristics of a portion of an image 302. The portion of the image can include the entirety of the image 302, or a sub-portion of the image. In some implementations, the image features 306 can include color, texture, edges, saturation, and other characteristics. Example processes for extracting values of image features 306 from which a feature score can be computed include processes for generating color histograms, texture detection processes (e.g., based on spatial variation in pixel intensities), scale-invariant feature transform, edge detection, corner detection, and geometric blur.

The joint image-audio relevance model 108 receives the image feature data 306 and text data 308. The model 108 also accesses resources 314 in a collection of resources. With each resource 314 accessed, the model 108 generates resource image feature data from the resource image, in a manner similar to the query image 302. The model 108 also determines text data from the resource 314, such as text on a web page that includes the image, or text associated with the image according to a database schema (e.g., a database of commercial products). The model 108 compares the query image feature data with the resource image feature data, and the query text data with the resource text data and computes a relevance score for that resource 314. The model 108 computes relevance scores for each resource in the collection of resources, ranks the resources according to the scores, and returns a ranked list of the resources 312. The search system 106 then generates search results that reference the images and resources, and provides the search results to the user.

In some implementations, this process may be repeated iteratively one or more times. For example, after producing a list of resources ranked by relevancy 312 to the image-audio query 302, 304, the system 106 may use one or more of the highest ranked resource images to run another query. This may produce an improved list of relevance resources. Alternatively or in combination, the system may use resource text data from one or more highest ranked resources in addition to or in place of the original query text data 308.

§3.0 Training the Joint Image-Audio Relevancy Model

For the joint image-audio relevancy model 310 to be able to correctly compute relevance scores, it is first trained. FIG. 3B is a block diagram of an example process 350 for training a joint image-audio relevance model 108. The model is trained using annotation pairs. Similar to a joint image-audio query, an annotation pair has image data 352 and associated audio data 354. The set of annotation pairs can be partitioned into a training set and a testing set.

Taking annotations pairs from the training set, image feature data 358 is generated from the annotation image data 352 using similar image processing algorithms as those used on the query image. Text data 360 is determined from the annotation audio data 354 using similar speech recognition and natural language processing techniques as those used on the query audio. A training model 362 receives as input the image feature data 358 and the text data 360. The training model 362 also receives as input a resource 356 with a predetermined relevance to the annotation pair 352, 354. This predetermined relevance may be binary (e.g. relevant/not relevant), or on a relative scale (e.g., highly relevant, somewhat relevant, not relevant), or on a scale with more refined values. The model 362 generates resource image feature data from the resource image and determines resource text data from the resource text. Comparing the annotation image feature data 352 to the resource image feature data and the annotation text data 354 to the resource text data, the training model 362 computes a relevance score. Weights that correspond to the image features and text features are adjusted to produce a score in the correct range of the predetermined relevancy. This process is repeated for different resources and with different training annotation pairs, all with predetermined relevancies.

The testing set of annotation data may then be used to verify the trained model. The trained model may receive as input annotation pairs from the testing set, along with resources that have predetermined relevance to each of the testing pairs. The testing pairs and resources would be processed to generate feature data as done with the training pairs. The model would then generate relevance scores for each of these sets of inputs. If the relevance scores are within a threshold range of acceptability, then the model is adequately trained. If, however, the model generates relevance scores that are not within the threshold range of acceptability, then the model is not adequately trained and the training process may be repeated with the training set of annotation data, and the assigned weights reevaluated and readjusted.

This threshold range may be established many different ways. For example, each of the qualitative scale values in the predetermined relevance scale can be assigned relevance score ranges. For example, if the relevance scores generated by the model range from 1 to 100, in a binary predetermined relevance scale, the threshold may be set at greater than or equal to 50 for relevant and less than 50 for not relevant. Alternatively, the threshold may be made more stringent by assigning, for example, greater than 75 for relevant and less than 25 for not relevant. This may provide for a more effective image-audio relevance model, but may also require more iterations of training to produce. Alternatively, the threshold of acceptability may be more qualitative. For example, for a given annotation pair, there may be a set of resources, with a predetermined ranking from more relevant to less relevant. The acceptability of the training of the model may be evaluated by seeing how close the trained model comes to providing the correct ranking of the resources for the annotation pair.

§3.1 Selection of Annotation Pair Data

The annotation data may be obtained in a variety of ways. In one implementation, the annotation data is derived from a product database, the product database having a collection of product documents. Each product document has an image of a product and associated text with information regarding the product, such as a description, prices, sellers of the product, and reviews and ratings of both the product and sellers of the product. The annotation pair 352, 354 includes the image from a product document and a subset of the text from the same document. This would also allow for a predetermined relevance between the product document and the annotation pair 352, 354 created from that document. Since the annotation pair 352, 354 was created from that product document, the annotation pair must be highly relevant to the product document.

In another implementation, the annotation data is derived from selection data from image search result data. Query input text entered by users into an image search system may be used as the annotation text data 354 of an annotation pair. The annotation image data 352 for the pair may be chosen from images that are the most popular results from the image search corresponding to the query input. The popularity of results may be determined by statistical measures such as click through rate. Alternatively, the annotation data may be from selection data from product search result data. The query input can again be used as the annotation text data 354 for an annotation pair. The annotation image 352 may be obtained from the product image of the most popular product documents selected by users for that query input. This would also provide product documents to use as resources with high predetermined relevance.

In another implementation, the annotation data is derived from selection data from general web search result data. Query input text entered by users into a web search system may be used as the annotation text data 354 of an annotation pair. The web search system may return general web resources, including websites, images, and product documents. If the user selects a product document as a result of the web search, the product image may be used as the annotation image data 352 for the annotation pair. The product document is then used as the resource with known high relevancy.

In another implementation, human annotators may be used to provide training data. The annotators may take a photograph to provide the annotation image 352, and provide speech or text data for the annotation text data 354 of resources they wish to search for. The annotators may then search through a product document or other resource database and find resources that are both related and unrelated to the photograph and speech data they provided. For each resource they find, the annotators can then label it as a good quality match or a poor quality match. In another implementation, the annotators may be used to rate the quality of matches determined through an automated procedure. For example, any of the previously discussed procedures may be used to obtain annotation data from a product database, product search selection data, image search selection data, or web search selection data, and human annotators may rate the relevance of each annotation pair with the resource selected by the automated process.

§3.2 Example Scoring Models

A variety of models can be used to realize the relevance function $f(S, I, R)$, and examples are described below. One example model implements a relevance function that is a linear combination of constituent models trained on image feature data and audio and text data, i.e., $$f(S,I,R)=cf_s(S,R)+(1-c)f_I(I,R)$$

where $f_s$ is a scoring function trained on the speech and text data, and $f_I$ is a scoring function trained on the image feature data. The mixing parameter c is a value that is adjusted between 0 and 1.

Another example model implements a relevance function $f(S, I, R)$ that restricts the set of resource items considered to only those with textual descriptions that contain the words in S. Using this restricted set, the model then scores on the relevance of the image feature data. Thus, the relevance function would be $$f(S,I,R)=f_I(I,R)f(S,R)$$

where $f(S, R)=1$ if text S is in the resource R and $f(S, R)=0$ otherwise.

Another example model implements a relevance function $f(S, I, R)$ where an image feature relevance function is learned for every possible choice of S, i.e., $$f(S,I,R)=W_S \cdot \Phi(I,R)$$

where $\Phi(I, R)$ is the feature representation of the image and resource, and $W_s$ is a learned feature weight matrix of features representing images and resources. $W_s$ is a $1 \times |\Phi(I,R)|$ matrix, or a vector of dimension $|\Phi(I,R)|$, that is, the number of features that are used to represent the image and resource.

Yet another example model implements a relevance function using one linear ranking function, i.e., $$f(S,I,R)=W \cdot \Phi(S,I,R).$$

Another example model implements a relevance function that is an extension to the approach found in the paper, "Large Scale Image Annotation: Learning to Rank with Joint Word-Image Embeddings," by Jason Weston, Samy Bengio, and Nicolas Usunier ("Weston paper"), incorporated herein by reference. The approach in the Weston paper involves training on an "embedding space" representation of arbitrary dimension, where distance between two items in the space denotes their similarity. This model involves the function $$f(S,I,R)=(W_{SI}\cdot\Phi_{SI}(S,I))\cdot(W_R\cdot\Phi_R(R))$$

where $W_{SI}$ and $W_R$ are matrices, and the method learns both matrices and an embedding space of dimension R that is typically low dimensional. $W_{SI}$ is an $R\times|\Phi_{SI}(S, I)|$ matrix, where R is the dimensions of the embedding space and $|\Phi_{SI}(S, I)|$ is the number of features used to represent the text and image jointly. $W_R$ is an $R\times|\Phi_R(R)|$ matrix, where $|\Phi_R(R)|$ is the number of features used to represent the resource. The embedding space in the Weston paper only used images and labels. The approach is extended here by concatenating the speech and image features in a single features space $\Phi_{SI}(S, I)$.

Another example model implements a relevance function that further extends the Weston paper approach. The relevance function is defined by $$f(S,I,R)=\Sigma(W_S\cdot\Phi_S(S))*(W_I\cdot\Phi_I(I))*(W_R\cdot\Phi_R(R))$$

where the * operation is the component-wise multiplication of vectors. This function allows for more complex nonlinear interactions between the features of the image, speech, and resource.

§4.0 Example Processes

Figure 4:
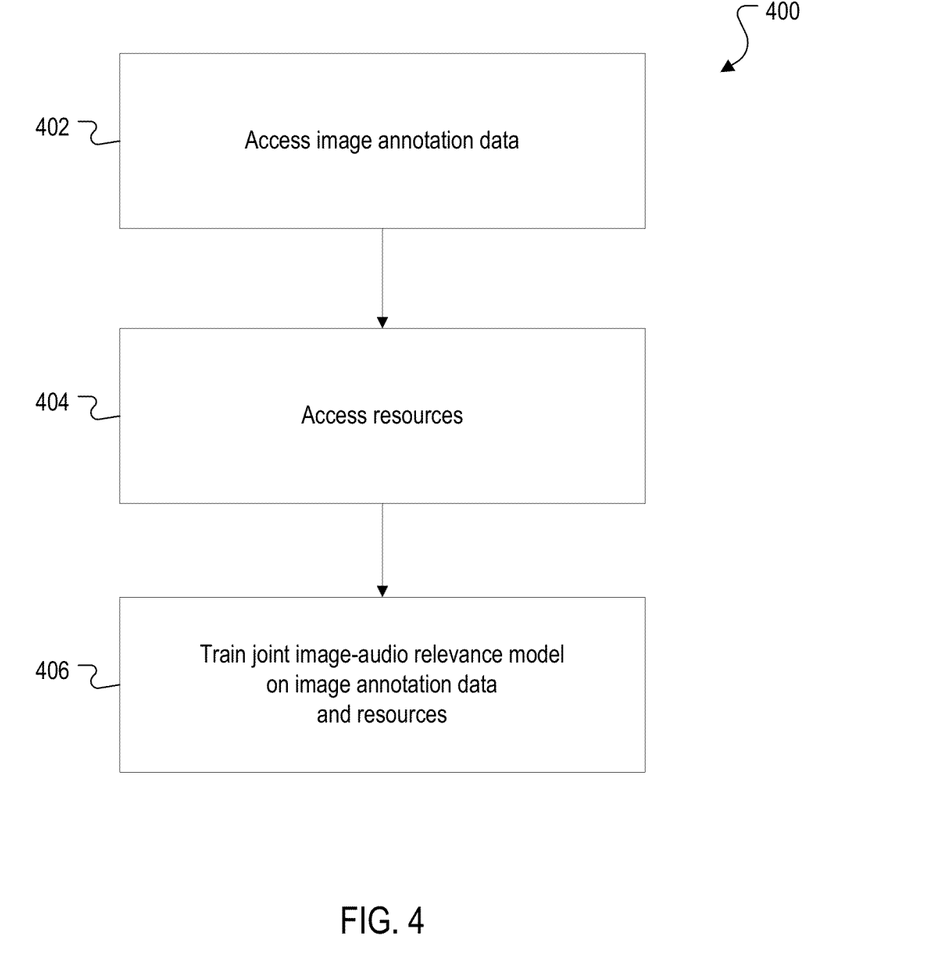
FIG. 4 is a flow chart of an example process for training a joint image-audio relevance model.

FIG. 4 is a flowchart of an example process 400 for training a joint image-audio relevance model 108. The process 400 can be implemented in the search system 106 and is used to train a joint image-audio relevance model 108.

The process 400 accesses image annotation data (402). For example, the search system 106 accesses image annotation data from a product database. The search system 106 may also access image annotation data from product search selection data. In another example, the search system 106 accesses image annotation data from image search selection data. In another implementation, the search system 106 accesses image annotation data from web search selection data. The search system 106 may also access image annotation data from data annotated by human annotators. The human annotators may create their own image and speech data to annotate, or may access data to annotate from a product database or another automated process.

The process 400 accesses resources (404). For example, the search system 106 accesses resources comprising product documents from a product database.

The process 400 trains a joint image-audio relevance model on the image annotation data and resources (406). For example, the search system 106 trains a joint image-audio relevance model using the image annotation data from the product database and the resources from the product database. The joint-image audio relevance model can, for example, be trained according to any of the training algorithms described in section 3.2 above, or other training algorithms can be used.

Figure 5:
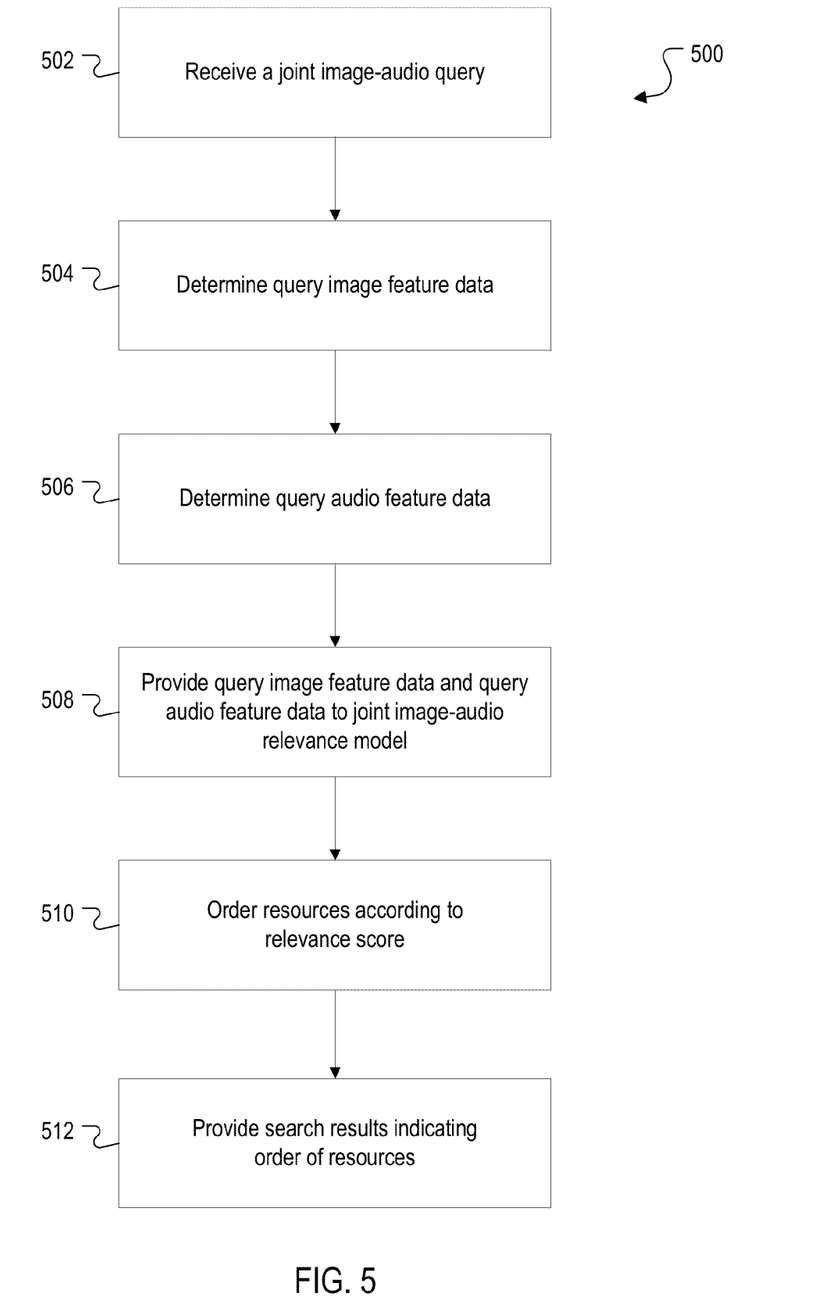
FIG. 5 is a flow chart of an example process for ranking resources for a joint image-audio query.

FIG. 5 shows a flowchart of an example process 500 for ranking resources for a joint image-audio query. The process 500 can be implemented in the search system 106 and is used to rank resources for a joint image-audio query.

The process 500 receives a joint image-audio query (502). For example, the search system 106 receives a joint image-audio query from a user device through the network.

The process 500 determines query image feature data (504). For example, the search system 106 generates image feature value data from the query image received from the user device.

The process 500 determines query audio feature data (506). For example, the search system 106 processes the audio data to generate text data from audio data comprising speech data.

The process 500 provides query image feature data and query audio feature data to the joint image-audio relevance model (508). For example, the search system 106 provides query image feature data and text data to the joint image-audio relevance model. The joint image-audio relevance model is trained to generate relevance scores for a collection of resources.

The process 500 orders resources according to their relevance scores (510). For example, the search system 106 orders the resources from most relevant to least relevant to the image-audio query.

The process 500 provides search results indicating the order of the resources (512). For example, the search system 106 provides search results comprising a list of resource addresses, ranked from most relevant to least relevant to the user device.

§5.0 Additional Implementation Details

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   receiving, by a data processing apparatus, a joint image-audio query sent to the data processing apparatus from a client device separate from the data processing apparatus, the joint image-audio query including query image data defining a query image and query audio data defining query audio, wherein:
      the query image data is an image file;
      the query audio data is an audio recording file of speech; and
      the query image data and the query audio data are paired as the joint-image audio query at the client device and then sent to the data processing apparatus;
   determining, by the data processing apparatus, query image feature data from the query image data included in the received joint image-audio query, the query image feature data describing image features of the query image;

determining, by the data processing apparatus, query audio feature data from the audio data included in the received joint image-audio query, the query audio feature data including text derived from the audio recording of speech;

providing, by the data processing apparatus, the query image feature data and the query audio feature data to a joint image-audio relevance model that i) receives, as input, image feature data and audio feature data, and ii) is trained to generate relevance scores for a plurality of resources based on a combined relevance of the query image feature data to image feature data of the resource and the text derived from the audio recording of speech to text of the resource;

identifying, by the data processing apparatus, resources responsive to the joint image-audio query based, in part, on a corresponding relevance score that was determined by the joint image-audio relevance model, wherein each identified resource includes i) resource image data defining a resource image for the identified resource, and ii) text data defining resource text for the identified resource, and wherein each relevance score for each identified resource is a measure of the relevance of the corresponding resource image data and text data defining the resource text to the query image feature data and the text derived from the audio recording of speech;

ordering, by the data processing apparatus, the identified resources according to the corresponding relevance scores; and providing, by the data processing apparatus, data defining search results indicating the order of the identified resources to the client device.

2. The computer-implemented method of claim 1 wherein the query audio feature data includes data that relates to a query object in the query image data by further describing the query object, the query object being a subset of the query image that includes image data that depicts an object of interest.

3. The computer-implemented method of claim 2 wherein the data that relates to the query object in the query image further describes information indicating a position of the query object.

4. The computer-implemented method of claim 1 wherein the query audio feature data includes data that defines one or more restrictions on the search results.

5. The computer-implemented method of claim 1 wherein one or more resource images are used to refine the search results.

6. The computer-implemented method of claim 1 wherein one or more resource text data are used to refine the search results.

7. A system, comprising:

a data processing apparatus; and a computer storage medium encoded with a computer program, the program comprising instructions that when executed by the data processing apparatus cause the data processing apparatus to perform operations comprising:

receiving a joint image-audio query sent to the data processing apparatus from a client device separate from the data processing apparatus, the joint image-audio query including query image data defining a query image and query audio data defining query audio, wherein:

the query image data is an image file;

the query audio data is an audio recording file of speech; and the query image data and the query audio data are paired as the join-image audio query at the client device and then sent to the data processing apparatus;

determining query image feature data from the query image data included in the received joint image-audio query, the query image feature data describing image features of the query image;

determining query audio feature data from the audio data included in the received joint image-audio query, the query audio feature data including text derived from the audio recording of speech;

providing the query image feature data and the query audio feature data to a joint image-audio relevance model that i) receives, as input, image feature data and audio feature data, and ii) is trained to generate relevance scores for a plurality of resources based on a combined relevance of the query image feature data to image feature data of the resource and the text derived from the audio recording of speech to text of the resource;

identifying resources responsive to the joint image-audio query based, in part, on a corresponding relevance score that was determined by the joint image audio relevance model, wherein each identified resource includes resource image data defining a resource image for the identified resource and text data defining resource text for the identified resource, and wherein each relevance score for each identified resource is a measure of the relevance of the corresponding resource image data and text data defining the resource text to the query image feature data and the text derived from the audio recording of speech;

ordering the identified resources according to the corresponding relevance scores; and providing data defining search results indicating the order of the identified resources to the client device.

8. The system of claim 7 wherein the query audio feature data includes data that relates to a query object in the query image data by further describing the query object, the query object being a subset of the query image that includes image data that depicts an object of interest.

9. The system of claim 7 wherein the data that relates to the query object in the query image further describes information indicating a position of the query object.

10. The system of claim 7 wherein the query audio feature data includes data that defines one or more restrictions on the search results.

11. The system of claim 7 wherein one or more resource images are used to refine the search results.

12. The system of claim 7 wherein one or more resource text data are used to refine the search results.

13. A computer storage device encoded with a computer program, the program comprising instructions that when executed by a client device cause the client device to perform operations comprising:

receiving a joint image-audio query sent to the data processing apparatus from a client device separate from the data processing apparatus, the joint image-audio query including query image data defining a query image and query audio data defining query audio, wherein:

the query image data is an image file;

the query audio data is an audio recording file of speech; and the query image data and the query audio data are paired as the join-image audio query at the client device and then sent to the data processing apparatus;

determining query image feature data from the query image data included in the received joint image-audio query, the query image feature data describing image features of the query image;

determining query audio feature data from the audio data included in the received joint image-audio query, the query audio feature data including text derived from the query audio;

providing the query image feature data and the query audio feature data to a joint image-audio relevance model that i) receives, as input, image feature data and audio feature data, and ii) is trained to generate relevance scores for a plurality of resources based on a combined relevance of the query image feature data to image feature data of the resource and the text derived from the audio recording of speech to text of the resource;

identifying resources responsive to the joint image-audio query based, in part, on a corresponding relevance score that was determined by the joint image audio relevance model, wherein each identified resource includes resource image data defining a resource image for the identified resource and text data defining resource text for the identified resource, and wherein each relevance score for each identified resource is a measure of the relevance of the corresponding resource image data and text data defining the resource text to the query image feature data and the text derived from the audio recording of speech;

ordering the identified resources according to the corresponding relevance scores; and providing data defining search results indicating the order of the identified resources to the client device.

* * * * *

UNITED STATES PATENT AND TRADEMARK OFFICE
CERTIFICATE OF CORRECTION

PATENT NO. : 8,788,434 B2  
APPLICATION NO. : 12/914653  
DATED : July 22, 2014  
INVENTOR(S) : Makadia et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this
Fifth Day of April, 2016

Michelle K. Lee
*Director of the United States Patent and Trademark Office*